(12) United States Patent
Nemoto et al.

(10) Patent No.: US 9,620,749 B2
(45) Date of Patent: Apr. 11, 2017

(54) ELECTRIC STORAGE APPARATUS

(71) Applicant: Lithium Energy Japan, Kyoto-shi (JP)

(72) Inventors: Seiji Nemoto, Ritto (JP); Tatsuya Masumoto, Ritto (JP); Yoshihiro Masuda, Ritto (JP); Yo Hasegawa, Ritto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 13/745,597

(22) Filed: Jan. 18, 2013

(65) Prior Publication Data

US 2013/0189549 A1 Jul. 25, 2013

(30) Foreign Application Priority Data

Jan. 24, 2012 (JP) ................................ 2012-012121
Jan. 9, 2013 (JP) ................................ 2013-002027

(51) Int. Cl.
| | | |
|---|---|---|
| *H01M 10/42* | (2006.01) | |
| *H01M 2/10* | (2006.01) | |
| *H01G 2/10* | (2006.01) | |
| *H01G 2/18* | (2006.01) | |
| *H01G 11/10* | (2013.01) | |
| *H01G 11/14* | (2013.01) | |
| *H01G 11/82* | (2013.01) | |
| *H01M 10/48* | (2006.01) | |

(52) U.S. Cl.
CPC .......... *H01M 2/1077* (2013.01); *H01G 2/106* (2013.01); *H01G 2/18* (2013.01); *H01G 11/10* (2013.01); *H01G 11/14* (2013.01); *H01G 11/82* (2013.01); *H01M 10/425* (2013.01); *H01M 10/482* (2013.01); *Y02E 60/13* (2013.01)

(58) Field of Classification Search
CPC ..................................................... F16B 5/0016
USPC .................................. 429/47, 48, 61, 65, 96
See application file for complete search history.

(56) References Cited

U.S. PATENT DOCUMENTS

| | | | | |
|---|---|---|---|---|
| 5,534,364 A * | 7/1996 | Watanabe et al. | ............. | 429/61 |
| 5,788,211 A * | 8/1998 | Astier | ............................ | 248/674 |
| 6,104,967 A * | 8/2000 | Hagen et al. | ................. | 700/293 |
| 7,749,643 B2 * | 7/2010 | Tsai | .............................. | 429/100 |
| 8,282,275 B2 | 10/2012 | Akaboshi et al. | | |
| 2010/0047676 A1 | 2/2010 | Park et al. | | |
| 2010/0124693 A1 | 5/2010 | Kosugi et al. | | |
| 2011/0212348 A1* | 9/2011 | Yasui et al. | ....................... | 429/7 |
| 2013/0003320 A1* | 1/2013 | Dunham et al. | ............. | 361/748 |

(Continued)

FOREIGN PATENT DOCUMENTS

| | | |
|---|---|---|
| JP | H07-122249 A | 5/1995 |
| JP | 2002-157984 A | 5/2002 |
| JP | 2006-134801 A | 5/2006 |

(Continued)

*Primary Examiner* — Maria J Laios
*Assistant Examiner* — Haroon S Sheikh
(74) *Attorney, Agent, or Firm* — McGinn IP Law Group, PLLC.

(57) ABSTRACT

Provided is an electric storage apparatus including: an electric storage device; a circuit module; and an enclosure for housing the electric storage device, wherein: any one thereof includes an engaging portion; any one of the remaining ones includes an engaged portion; and the engaging portion and the engaged portion are engageable with and disengageable from each other.

19 Claims, 8 Drawing Sheets

(56) References Cited

U.S. PATENT DOCUMENTS

2013/0101883 A1* 4/2013 Zhao .................. H01M 2/26
                                                          429/121

FOREIGN PATENT DOCUMENTS

| | | |
|---|---|---|
| JP | 2006-270121 A | 10/2006 |
| JP | 2007-234371 A | 9/2007 |
| JP | 2009-289428 A | 12/2009 |
| JP | 2010-500721 (A) | 1/2010 |
| JP | 2010-123299 A | 6/2010 |
| JP | 2010-160930 (A) | 7/2010 |
| JP | 2010-282816 (A) | 12/2010 |
| JP | 2011-049014 A | 3/2011 |
| WO | WO 2013/031614 A1 | 3/2013 |

* cited by examiner

F I G. 5
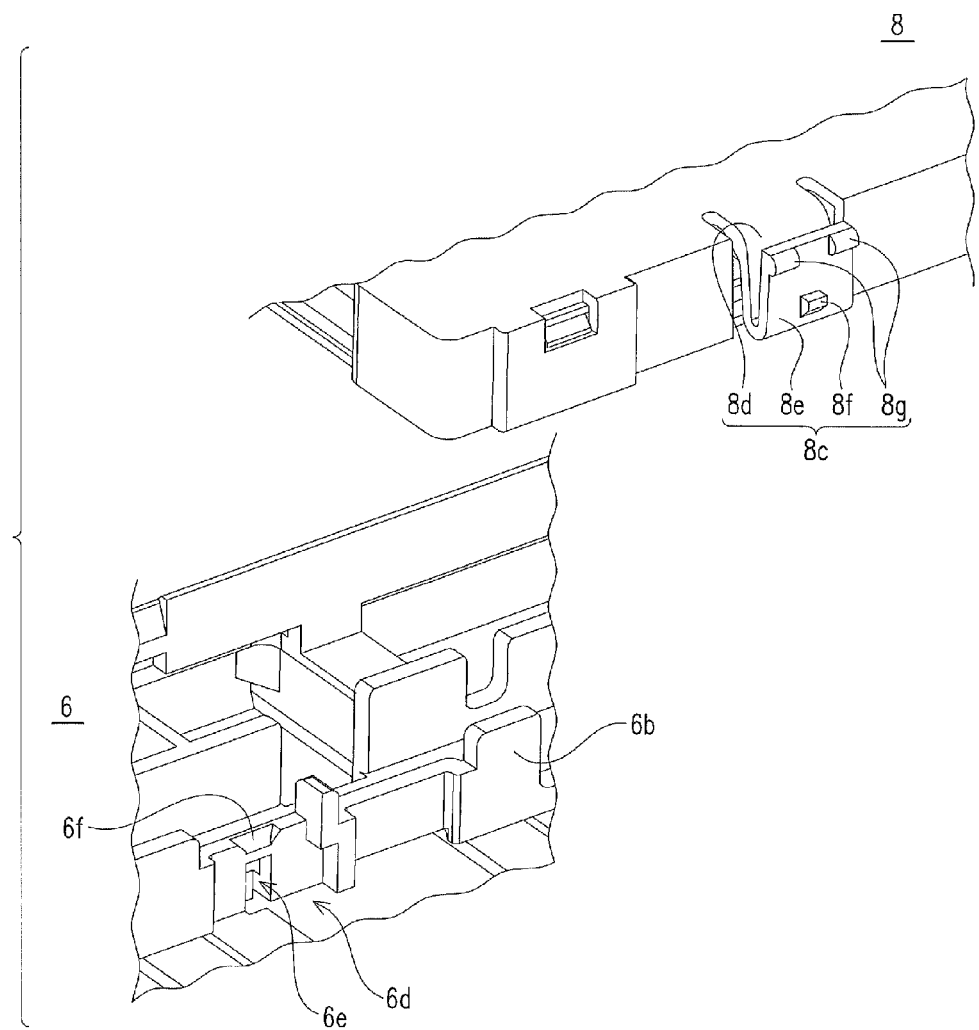

ELECTRIC STORAGE APPARATUS

CROSS-REFERENCE TO RELATED APPLICATION

The present application claims the priority of Japanese Patent Application No. 2012-012121, the entire contents of which are incorporated herein by reference.

FIELD OF THE INVENTION

The present invention relates to an electric storage apparatus provided with electric storage devices, such as battery cells (unit cells) or capacitors, and a circuit, such as a monitoring circuit for individually monitoring the electric storage devices.

BACKGROUND ART

Hybrid electric vehicles low in $CO_2$ emissions and electric vehicles free of $CO_2$ emissions (hereinafter generically referred to as "electricity-powered vehicles") are mounted with power supply units as means for driving traction motors. This type of power supply unit includes as many cell modules, in each of which a plurality of battery cells are electrically connected and packaged into a single unit, as are consistent in number with the required specifications of the electricity-powered vehicle concerned. A high-power secondary battery, such as a lithium-ion battery cell or a nickel-hydrogen battery cell, is used for each battery cell.

These batteries are susceptible to overcharge and overdischarge, however. Unless used in a prescribed range of charging voltages, these batteries may have such problems that materials decompose to significantly degrade capacity or the batteries generate unusual heat, thus becoming no longer unusable. In order to prevent these problems, the upper and lower voltage limits of a battery needs to be explicitly defined to control the charge and discharge of the battery, so that the terminal voltages of the battery fall within the upper and lower voltage limits.

Hence, as disclosed in Patent Document 1 (Japanese Patent Laid-Open No. 2010-282816, paragraphs 0017 and 0018), this type of power supply unit is provided with cell monitor unit (CMU), one each in respective cell modules or one each in a group of several cell modules, used to independently monitor each battery cell within the abovementioned range, specifically cell monitor units used to monitor at least one of the voltage, current and temperature of each battery cell within the abovementioned range. In addition, the power supply unit is provided with a battery management unit (BMU) for performing integrated monitoring or integrated managing of respective cell monitor units.

According to Patent Document 1, one end of an electro-conductive and thermally-conductive metal plate 18 is connected to an electrode terminal 12 of a battery cell 11, and a metal terminal 20 is joined to the other end of the metal plate 18. The metal terminal 20 is electrically and thermally joined to the electrode terminal 12 through the metal plate 18, so as to be able to detect the voltage of the battery cell 11. A battery monitoring apparatus board 31, which is a CMU 30, is disposed on the upper side of the metal plate 18 across a plurality of battery cells 11 in a cell module 10 and is fastened at the metal terminal 20.

Incidentally, if, for example, a cell monitor unit becomes damaged due to aging or for some other reason, though extremely unlikely, the unit has to be replaced with new one.

In the cell module disclosed in the aforesaid Patent Document 1, however, the cell monitor unit cannot be easily detached because of the structure of the cell module. Accordingly, the cell module has the problem that the work of replacing the cell monitor unit is cumbersome and complicated. This also holds true when the cell monitor unit is temporarily detached for reasons of, for example, verifying the operation of the cell monitor unit.

Also in the cell module disclosed in Patent Document 1, the cell monitor unit is exposed. Accordingly, the cell module has the problem that the cell monitor unit is susceptible to static electricity. Such a problem can occur not only in a period in which the cell monitor unit is attached to the cell module but also at the time of replacing the cell monitor unit with new one as described above.

These types of problems are not limited to battery cells and cell monitor units, but are also true for capacitors (electric double layer capacitors and the like) and other circuits.

SUMMARY OF THE INVENTION

Hence, the present invention has been accomplished in view of such problems as described above. A first object of the invention is to provide an electric storage apparatus in which a circuit can be easily detached. A second object of the invention is to provide an electric storage apparatus capable of preventing a circuit from being affected by static electricity.

According to a first aspect of the present invention, there is provided an electric storage apparatus including:
an electric storage device;
a circuit module; and
an enclosure for housing the electric storage device, wherein:
any one of the enclosure and the circuit module includes an engaging portion;
the other one of the enclosure and the circuit module includes an engaged portion; and
the engaging portion and the engaged portion are engageable with and disengageable from each other.

According to a second aspect of the present invention, there is provided an electric storage apparatus including:
an electric storage device;
a circuit; and
a case for housing the circuit, wherein:
one of the electric storage device and the case includes engaging portions;
the other one of the electric storage device and the case includes engaged portions; and
the engaging portions and the engaged portions are engageable with and disengageable from each other.

According to a third aspect of the present invention, there is provided an electric storage apparatus including:
an electric storage device; and
a circuit, wherein:
one of the electric storage device and the circuit includes an engaging portion;
the other one of the electric storage device and the circuit includes an engaged portion; and
the engaging portion and the engaged portion are engageable with and disengageable from each other.

BRIEF DESCRIPTION OF THE DRAWINGS

FIG. 5 is an enlarged perspective view of a structure of engagement between the case and the inner cover;

DETAILED DESCRIPTION OF THE PREFERRED EMBODIMENTS

Figure 1:
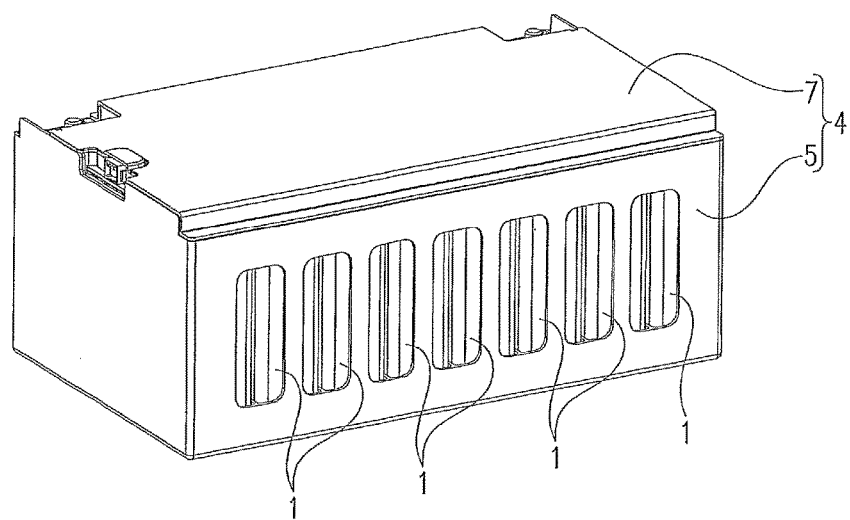
FIG. 1 is a perspective view of a cell module according to one embodiment of the present invention.
Figure 2:
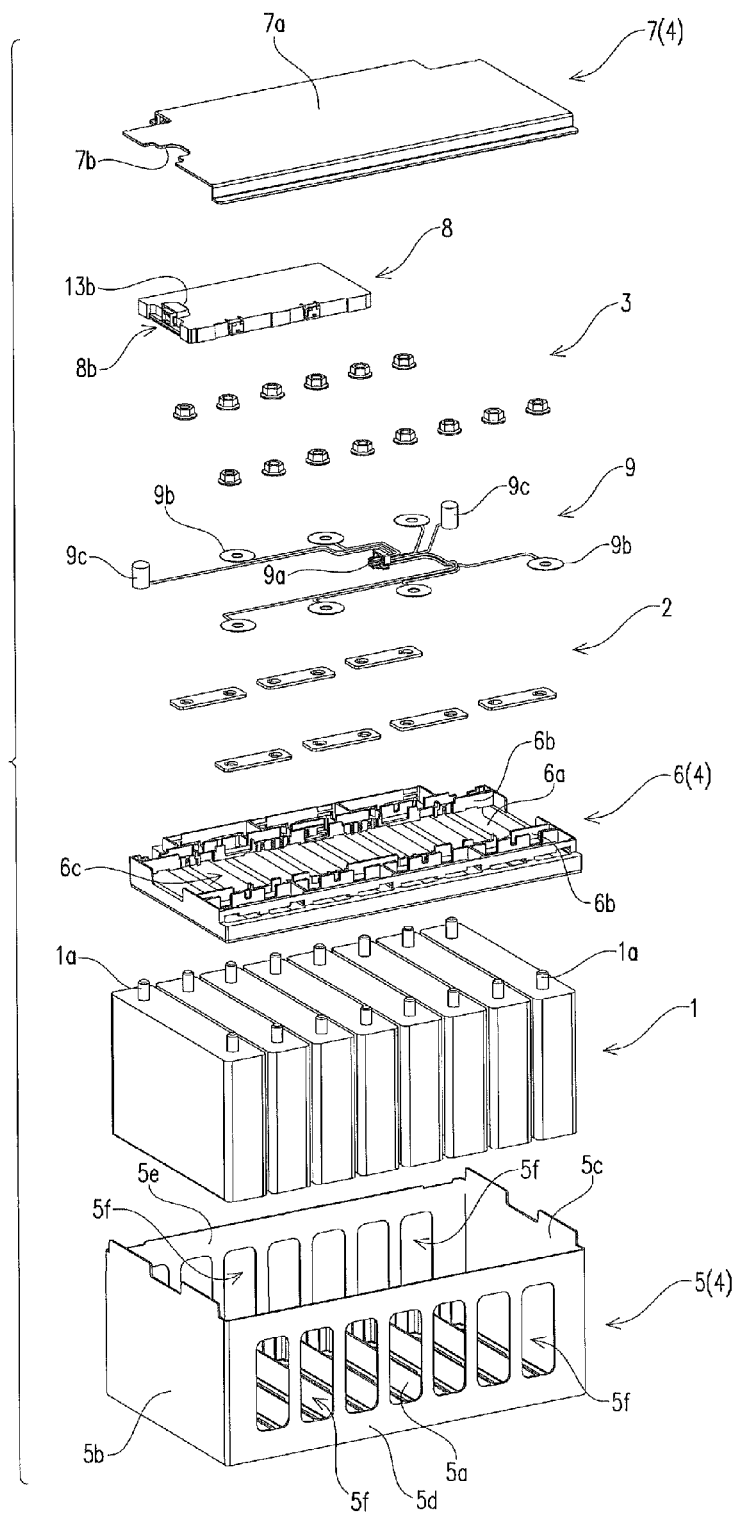
FIG. 2 is an exploded perspective view of the cell module.

Hereinafter, a cell module which is one embodiment of an electric storage apparatus according to the present invention will be described while referring to the accompanying drawings. As illustrated in FIGS. 1 and 2, the cell module according to the present embodiment includes a plurality of battery cells 1, and an enclosure 4 for housing the plurality of battery cells 1 with the battery cells aligned side by side.

Prismatic cells rectangular in external view or cylindrical cells columnar in external view can be adopted as the battery cells 1. The battery cells 1 according to the present embodiment are prismatic cells. Each battery cell 1 includes a pair of external terminals 1a. Bus bars 2 are attached to respective external terminals 1a, so as to bridge the external terminals 1a of adjacent battery cells 1. Under this condition, a nut 3 is screwed into each external terminal 1a. Consequently, the plurality of battery cells 1 are electrically connected to one another to constitute one cell.

The enclosure 4 is open at one surface and includes an enclosure body 5 for accommodating the plurality of battery cells 1 from the open surface, an inner cover 6 attached to the surface of the enclosure body 5, and an outer cover 7 for covering the inner cover 6.

The enclosure body 5 includes a bottom portion 5a mountable with a plurality of battery cells 1, a pair of wall portions 5b and 5c opposed to each other in the alignment direction of the plurality of battery cells 1 (hereinafter simply referred to as "alignment direction"), and a pair of wall portions 5d and 5e opposed to each other in a direction orthogonal to the alignment direction (hereinafter simply referred to as "orthogonal direction"). The pair of wall portions 5b and 5c and the pair of wall portions 5d and 5e constitute a frame portion surrounding the plurality of battery cells 1 in the circumferential direction thereof. The wall portions 5d and 5e include open portions 5f at locations thereof respectively corresponding to an intermediate position between battery cells 1 adjacent to each other in the alignment direction. For the purpose of cooling each battery cell 1, the wall portions 5c 1 and 5e are structured so that air passes from each open portion 5f of one of the wall portions 5d and 5e through between each adjacent battery cells 1 to exit out of each open portion 5f of the wall portion on the opposite side.

The inner cover 6 includes a base portion 6a mated with the upper-end opening portion of the frame portion of the enclosure body 5, and beam portions 6b installed on the base portion 6a. The beam portions 6b are provided along the alignment direction. More particularly, the beam portions 6b are provided along arrays of the external terminals 1a of the plurality of battery cells 1. In addition, the beam portions 6b are provided inside the arrays of the external terminals 1a in proximity thereto. Accordingly, the beam portions 6b are installed in a pair with a distance therebetween in the orthogonal direction. Accordingly, a space 6c extending along the alignment direction is formed between the pair of beam portions 6b. A CMU module 8 to be described later is housed in this space 6c.

The outer cover 7 includes a cover body 7a for covering the inner cover 6, and an inserted-through portion 7b through which a portion having a later-described swelled shape 13b formed in the CMU module 8 to be housed in the space 6c of the inner cover 6 is inserted. This portion of the CMU module 8 having the swelled shape 13b is greater in height than the external terminals 1a or the beam portions 6b, whichever is higher. The inserted-through portion 7b is a concave portion concavely formed in one end of the cover body 7a in the alignment direction. Specifically, the inserted-through portion 7b is provided in correspondence with the position of the swelled shape 13b of the CMU module 8 to be housed in the space 6c of the inner cover 6. The inserted-through portion 7b serves as a release portion for letting through the portion of the CMU module 8 having the swelled shape 13b, so that the overall height of the outer cover 7 is not excessively great. Consequently, a space to be occupied by the CMU module 8 is kept to a minimum.

A cell module according to the present embodiment includes a cell monitor unit module (hereinafter referred to as "CMU module") 8 for monitoring at least one of the voltage, current and temperature of a plurality of battery cells 1 for each thereof. The CMU module 8 is a thin, cartridge-type module formed to be rectangular (elongated rectangular in the present embodiment) in plan view. The CMU module 8 is disposed so as to fit in the space 6c between the above-described pair of beam portions 6b of the inner cover 6.

The CMU module 8 includes an input connector (not illustrated because the connector is formed to the right of the CMU module 8) and an output connector 8b. An output connector 9a formed in one end of a harness 9 in which a plurality of harness wires are bundled is coupled with the input connector. The output connector 9a is coupled with the input connector of the CMU module 8 from the alignment direction rather than from the latitudinal (vertical) direction of the module. Accordingly, the height of the wiring space of the harness 9 to be connected to the CMU module 8 can be kept low. Thus, a space between rows of the external terminals 1a is utilized as the wiring space.

Each harness wire of the harness 9 includes a connecting terminal 9b at the other end of the harness wire. The connecting terminal 9b is fitted in an external terminal 1a of each battery cell 1. A nut 3 is screwed in to fasten the connecting terminal 9b of the harness 9 after the connecting terminal 9b is fitted in the external terminal 1a prior to or subsequent to fitting a bus bar 2 in the external terminal 1a. The input connector (not illustrated) of a harness (not illustrated) to be connected to a battery monitoring circuit (not illustrated) is coupled with the output connector 8b.

Note that as described above, a plurality of battery cells 1 are electrically connected to one another with a plurality of bus bars 2 to constitute one battery. One external terminal 1a of a battery cell 1, among the plurality of battery cells 1, closest to the positive electrode side constitutes a positive electrode external terminal as that of a battery for external equipment. Likewise, one external terminal 1a of a battery cell 1, among the plurality of battery cells 1, closest to the negative electrode side constitutes a negative electrode external terminal as that of a battery for external equipment. For these positive and negative electrode external terminals, the harness 9 includes insulating caps (resin caps made of, for example, rubber) 9c, 9c. Note however that the caps 9c may be provided not integrally with the harness 9 but separately therefrom.

Figure 3:
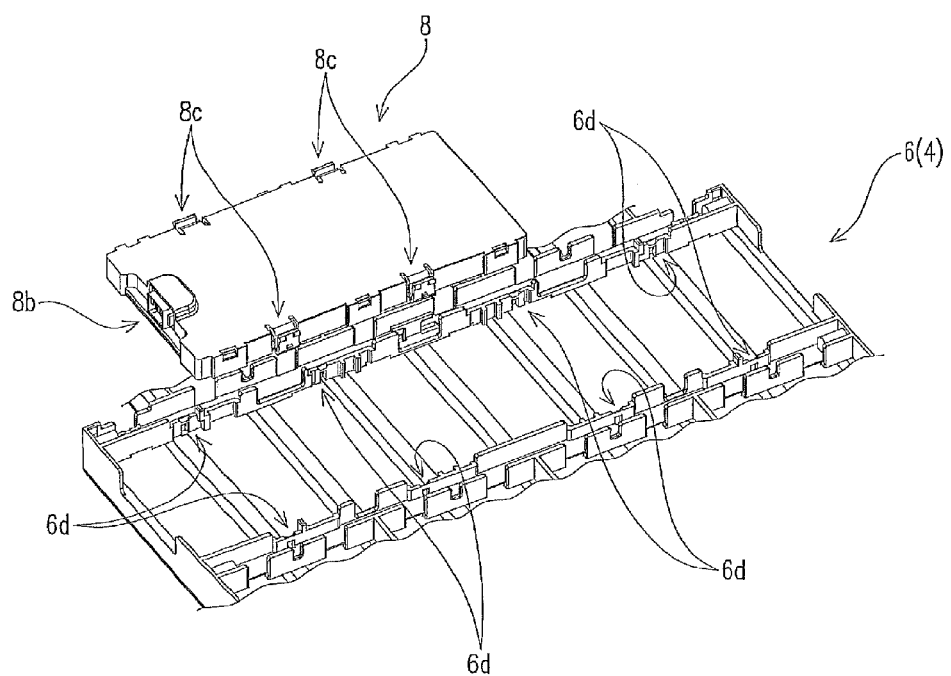
FIG. 3 is a perspective view of the cell module in which a case housing a cell monitor unit is detached from an inner cover.
Figure 4:
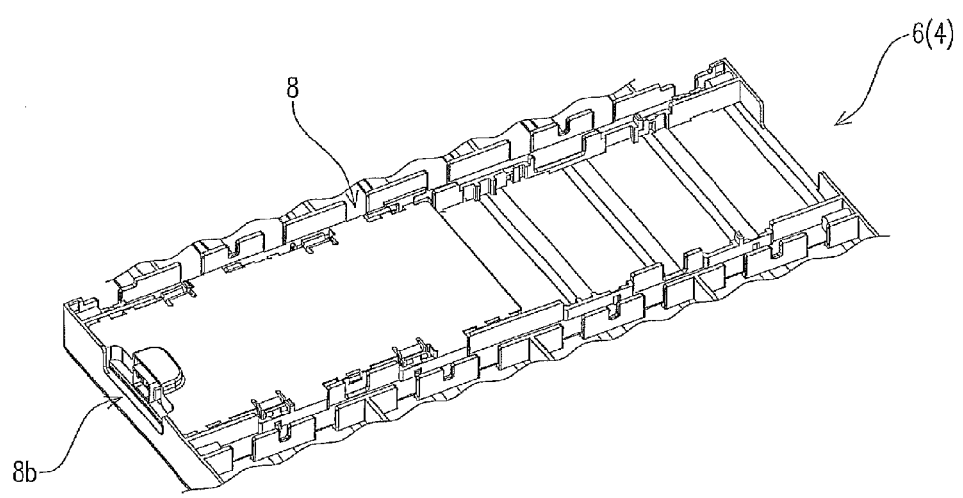
FIG. 4 is a perspective view illustrating a state of the case being attached to the inner cover.

As illustrated in FIGS. 3 and 4, the CMU module 8 includes engaging portions 8c. Accordingly, the inner cover 6 (beam portions 6b thereof) includes engaged portions 6d. These engaging portions 8c and engaged portions 6d constitute an engagement structure. Thus, the CMU module 8 is attachable to and detachable from the inner cover 6 by means of engagement and disengagement between the engaging portions 8c and the engaged portions 6d. More particularly, the CMU module 8 can be detached from the inner cover 6 by disengaging the engaging portions 8c from the engaged portions 6d. In addition, the CMU module 8 can be attached to the inner cover 6 by engaging the engaging portions 8c with the engaged portions 6d. As the result of the engaged portions 6d being provided in the beam portions 6b of the inner cover 6, the strength of the engaged portions 6d themselves enhances and the beam portions 6b increase the rigidity of the inner cover 6, thereby contributing to enhancing the strength of the inner cover 6. The plurality of harness wires are laid on the base portion 6a of the inner cover 6 to connect between the input connector and the respective external terminals 1a of the CMU module 8. The harness wires are substantially in plane with the CMU module 8. The beam portions 6b function as a guide for guiding the harness 9 for wiring between the CMU module 8 and the external terminals 1a.

The engaging portions 8c are provided on opposed two sides of the CMU module 8 (opposed two long sides in the present embodiment). In addition, the engaging portions 8c are provided at intervals in a plurality of places (two places in the present embodiment) of each side. Accordingly, the engaging portions 8c are provided in a plurality of places across the opposed two sides of the CMU module 8 (four places in the present embodiment).

On the other hand, the inner cover 6 includes engaged portions 6d in number corresponding to the number of the engaging portions 8c included in the CMU module 8, respectively on one and the other sides of the inner cover 6 in the alignment direction, so that the CMU module 8 can be mounted on either one or the other side of the inner cover 6 in the alignment direction. That is, the inner cover 6 includes engaged portions 6d twice as many as (eight in the present embodiment) the number of engaging portions 8c included in the CMU module 8. As described above, either one or the other side of the inner cover 6 in the alignment direction can be selected as a position where the CMU module 8 is to be mounted on the inner cover 6. This configuration increases the degree of freedom to select a position where the CMU module 8 is to be mounted.

As illustrated in FIG. 5, the engaging portions 8c are elastic pieces having flexibility. More particularly, each engaging portion 8c includes a first elastic piece 8d one end of which is connected to the body of the CMU module 8 and a second elastic piece 8e connected to the other end of the first elastic piece 8d. As the result of being folded back at the other end of the first elastic piece 8d to be connected thereto, the second elastic piece 8e is opposed to the first elastic piece 8d at a distance therefrom. Accordingly, each engaging portion 8c has a U-shape reduced in width when viewed from the lateral side.

A convex portion 8f is formed on the outer surface of the second elastic piece 8e, more particularly, in a position (central part of the second elastic piece 8e in the present embodiment) of the outer surface away from a location of connection with the first elastic piece 8d. The convex portion 8f is a cubic protrusion. A surface on the side of the connecting location between the first elastic piece 8d and the second elastic piece 8e, among the outer surfaces of the convex portion 8f, is an inclined surface (tapered surface) which comes closer to the outer surface of the second elastic piece 8e toward the connecting location side. In addition, a surface on the opposite side of the connecting location, among the outer surfaces of the convex portion 8f, is a vertical elevation surface with respect to the outer surface of the second elastic piece 8e.

Yet additionally, finger grip portions 8g are provided protrusively in positions (the other end portions of the second elastic piece 8e in the present embodiment) of the outer surface of the second elastic piece 8e further from the convex portion 8f with respect to the connecting location between the first elastic piece 8d and the second elastic piece 8e. The finger grip portions 8g are provided to make it easy for a person to lay fingers thereon, so that the person can easily bend the elastic piece 8c against the elastic force thereof. Note that the elastic piece 8c is formed so that the second elastic piece 8e bends toward the body of the CMU module 8 as the result of the second elastic piece 8e being urged to the first elastic piece 8d side.

On the other hand, each engaged portion 6d includes a concave portion 6e into which the convex portion 8f of each engaging portion 8c engages. The concave portion 6e is a slit which closes in the detaching direction of the CMU module 8. This closed surface (not illustrated because the surface is an upper surface of the concave portion 6e) is an engagement surface with which the above-mentioned elevation surface of the convex portion 8f engages. Accordingly, the closed surface is formed into a vertical elevation surface with respect to the detaching direction of the CMU module 8, so that the convex portion 8f does not easily break away from the concave portion 6e.

In addition, an inclined surface (tapered surface) 6f is formed in an end portion of the engaged portion 6d in the detaching direction of the CMU module 8. This inclined surface 6f is a guide portion which engages with the tapered surface of the convex portion 8f of the engaging portion 8c, so that the convex portion 8f is guided to the concave portion 6e of the engaged portion 6d, when the CMU module 8 is attached to the inner cover 6.

Accordingly, the inclined surface of the convex portion 8f of the engaging portion 8c slidingly contact with the inclined surface 6f of the engaged portion 6d when the CMU module 8 is attached. As a result, the elastic piece 8c bends against the elastic force thereof. Upon reaching the concave portion 6e of the engaged portion 6d, the convex portion 8f of the engaging portion 8c engages into the concave portion 6e. At this time, the bending of the elastic piece 8c is cancelled or reduced by an elastic restoring force. When this condition is reached, the elevation surface of the convex portion 8f abuts on the closed surface of the concave portion 6e and further movement of the convex portion 8f is restricted even if an attempt is made to detach the CMU module 8. Consequently, the convex portion 8f and the concave portion 6e interfere with each other, and the CMU module 8 cannot be detached from the inner cover 6 even if an attempt is made to pull up the CMU module 8.

In order to detach the CMU module 8 from the inner cover 6, the elastic piece 8c is bent against the elastic force thereof. More specifically, the elastic piece 8c is bent against the elastic force thereof in a direction away from the engaged portion 6d to release the convex portion 8f from the concave portion 6e, thereby disengaging the engaging portion 8c and the engaged portion 6d from each other.

In particular, the CMU module 8 is attachably and detachably disposed between the pair of beam portions 6b. Accordingly, as the result of the CMU module 8 being simply pressed into between the pair of beam portions 6b, the respective inclined surfaces of the convex portions 8f formed in the engaging portions 8c slidingly contact with the opposed inclined surfaces 6f of the engaged portions 6d of the pair of beam portions 6b. Thus, each elastic piece 8c becomes bent and the convex portion 8f thereof engages into the concave portion 6e of each engaged portion 6d.

Figure 6:
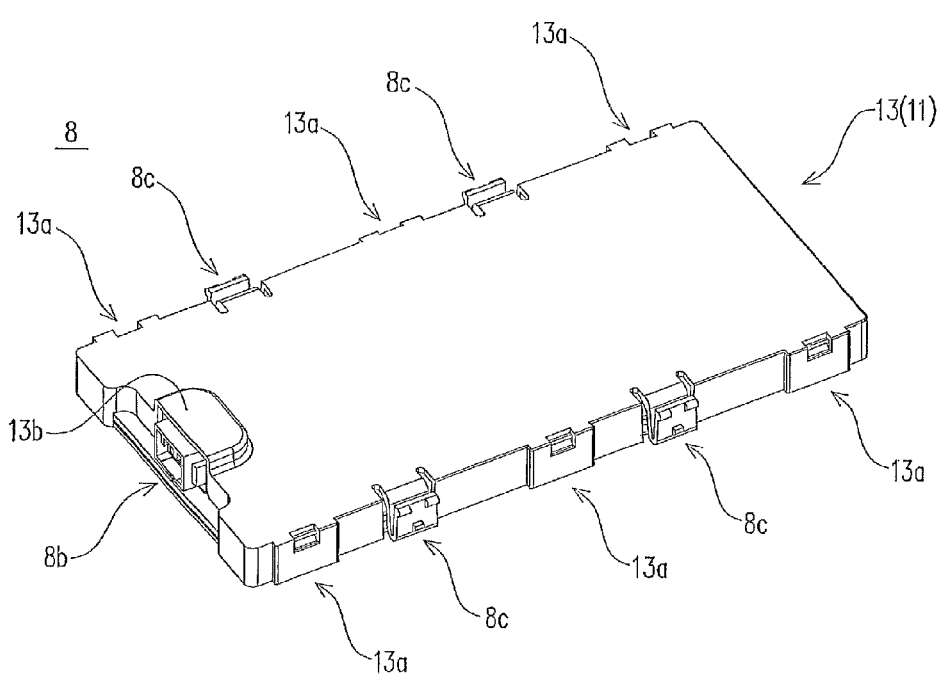
FIG. 6 is an enlarged perspective view of the case.
Figure 7:
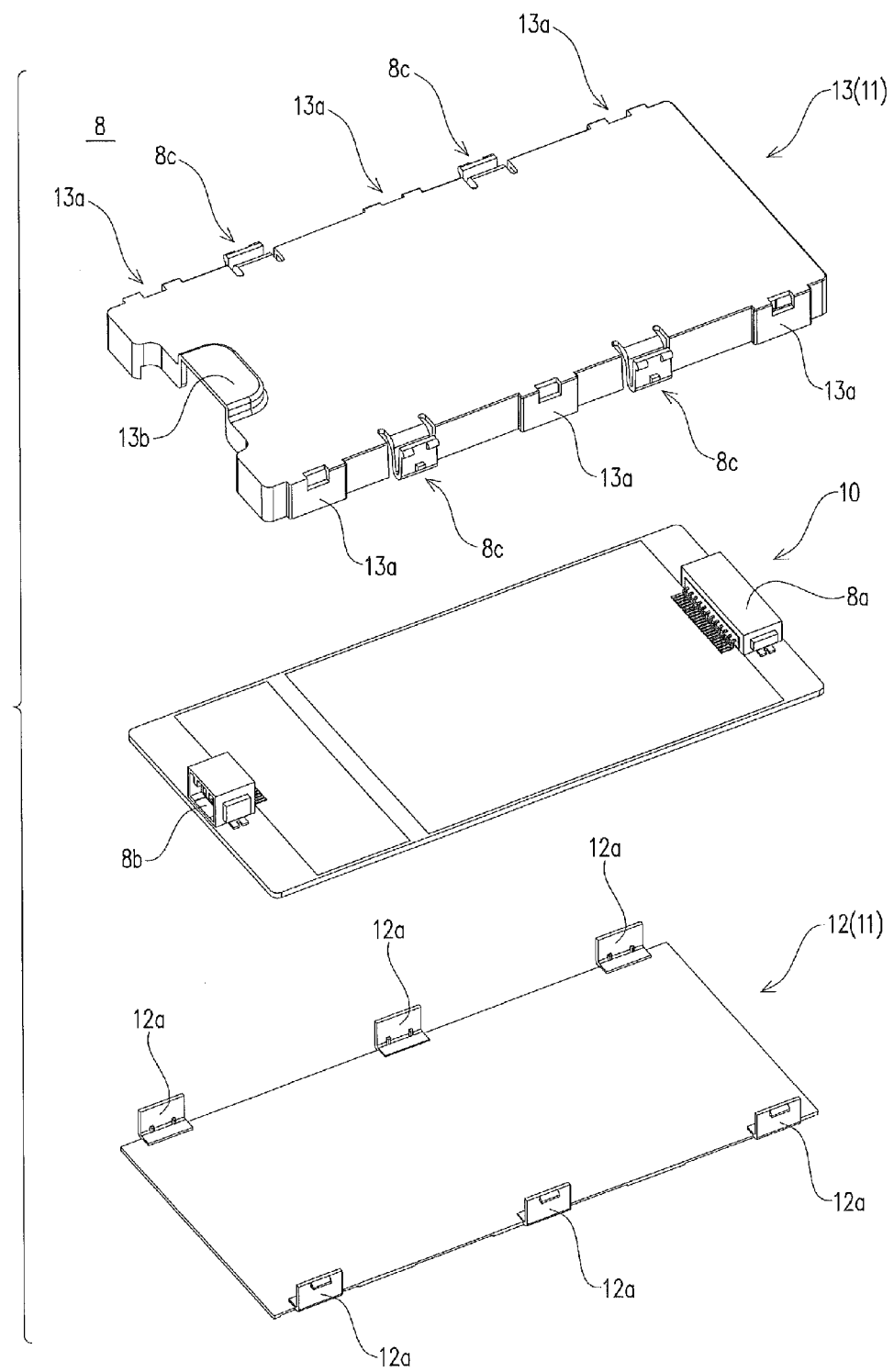
FIG. 7 is an exploded perspective view of the case.

Incidentally, the CMU module 8 includes a cell monitor unit (hereinafter referred to as "CMU") 10 and a case 11 for housing the CMU 10, as illustrated in FIGS. 6 and 7. The case 11 is separable and composed of a base 12 on which the CMU 10 is placed and a cover 13 which covers the base 12.

The base 12 includes a plurality of locking claws 12a in appropriate places along the outer circumference thereof. On the other hand, the cover 13 includes a plurality of receptacle portions 13a in places corresponding to the places in which the locking claws 12a are formed. Each locking claw 12a is received by a corresponding receptacle portion 13a and locked at the position where the locking claw 12a is received. Consequently, the cover 13 is attached to the base 12, thereby housing the CMU 10 so as to enclose the CMU 10. Specifically, each locking claw 12a is locked in each receptacle portion 13a as the result of a convex portion formed in the locking claw 12a being engaged into a concave portion formed in the receptacle portion 13a.

As described above, the CMU 10 is exposed only at the input connector 8a and output connector 8b thereof, and the rest of the CMU 10 is covered over. Note that the case 11 is desired to be as thin as possible. The portion of the CMU 10 where the output connector 8b is provided is the only location that cannot be made thinner, however, for reasons of the shape of the output connector 8b. The portion of the cover 13 corresponding to the output connector 8b is, therefore, formed of a swelled shape 13b.

As described above, the cell module according to the present embodiment includes battery cells 1 (electric storage devices), a CMU module 8, and an enclosure 4 for housing the battery cells 1, the CMU module 8 including engaging portions 8c, and the enclosure 4 including engaged portions 6d, wherein the engaging portions 8c and the engaged portions 6d are engageable with and disengageable from each other. Accordingly, the CMU module 8 can be detached from the enclosure 4 by disengaging the engaging portion 8c and the engaged portion 6d from each other. In addition, the CMU module 8 can be attached to the enclosure 4 (inner cover 6) by engaging the engaging portion 8c and the engaged portion 6d with each other. As a result, the CMU module 8 can be easily detached.

In particular, the battery module according to the present embodiment includes battery cells 1, a CMU module 8, and an enclosure 4 for housing the battery cells 1, the enclosure 4 including an enclosure body 5 for housing the battery cells 1 from one open surface, an inner cover 6 to be attached to the one open surface of the enclosure body 5, and an outer cover 7 for covering the inner cover 6, the CMU module 8 including engaging portions 8c, the inner cover 6 including engaged portions 6d, wherein the engaging portions 8c and the engaged portions 6d are engageable with and disengageable from each other. Accordingly, the CMU module 8 can be detached from the inner cover 6 by disengaging the engaging portion 8c and the engaged portion 6d from each other with the outer cover 7 removed. In addition, the CMU module 8 can be attached to the inner cover 6 by engaging the engaging portion 8c and the engaged portion 6d with each other. As a result, the CMU module 8 can be easily detached. Furthermore, as the result of the engaged portions 6d being provided in the inner cover 6, the engaged portion 6d and the inner cover 6 work together to thereby enhance the strength of the engaged portions 6d themselves and the strength of the inner cover 6 as well, thus exerting a synergistic effect.

Yet additionally, the CMU 10 can be prevented from being affected by static electricity by covering the CMU 10 with the case 11.

According to the cell module in accordance with the present embodiment, the inner cover 6 includes beam portions 6b, the CMU module 8 includes engaging portions 8c, and the beam portions 6b include engaged portions 6d. Accordingly, as the result of the engaged portions 6d being provided in the beam portions 6b of the inner cover 6, the strength of the engaged portions 6d themselves enhances. Consequently, the beam portions 6b increase the rigidity of the inner cover 6 and the strength thereof as well, thus exerting a synergistic effect.

Also according to the cell module in accordance with the present embodiment, the engaging portions 8c are provided so that one engaging portion 8c corresponds to and is engageable with each of a plurality of engaged portions 6d. Accordingly, the degree of freedom to select a position where the CMU module 8 is to be mounted on the inner cover 6 is increased by selecting engaged portions 6d located in the position where the CMU module 8 is to be mounted on the inner cover 6, from among the plurality of engaged portions 6d, and engaging the selected engaged portions 6d with corresponding engaging portions 8c.

Also according to the cell module in accordance with the present embodiment, each battery cell 1 includes external terminals 1a, the inner cover 6 includes beam portions 6b, and the outer cover 7 includes an inserted-through portion 7b through which a portion of the CMU module 8 having the swelled shape 13b greater in height than the external terminals 1a or the beam portions 6b, whichever is higher, is inserted. Accordingly, the outer cover 7 allows the portion of the CMU module 8 having the swelled shape 13b greater in height than the external terminals 1a or the beam portions 6b, whichever is higher, to be inserted through the inserted-through portion 7b. Consequently, the rest of the CMU module 8 no greater in height than the external terminals 1a or the beam portions 6b, whichever is higher, does not protrude heightwise above the external terminals 1a or the beam portions 6b. Consequently, a space occupied by the CMU module 8 as the result of the outer cover 7 covering over the inner cover 6 falls within the height of each external terminal 1a or each beam portion 6b, thus keeping the occupied space to a minimum.

Also according to the cell module in accordance with the present embodiment, the case 11 is separable. Accordingly, the case 11 can be disassembled to take out the CMU 10. Consequently, the case 11 can be reused even if, for example, the CMU 10 becomes damaged and needs to be replaced.

Also according to the cell module in accordance with the present embodiment, the engaging portions 8c are elastic pieces 8d and 8e having flexibility. Accordingly, the engaging portions 8c and the engaged portions 6d can be disengaged from each other by bending the elastic pieces 8d and 8e against the elastic force thereof, more specifically, by bending the elastic pieces 8d and 8e against the elastic force thereof in a direction away from the engaged portions 6d.

Also according to the cell module in accordance with the present embodiment, the engaged portions 6d include concave portions 6e, and the elastic pieces 8d and 8e include convex portions 8f to be engaged into the concave portions 6e. Accordingly, the engaging portions 8c and the engaged portions 6d engage with each other as the result of the convex portions 8f of the elastic pieces 8d and 8e being engaged into the concave portions 6e of the engaged portions 6d. The engaging portions 8c and the engaged portions 6d can be disengaged from each other by bending the elastic pieces 8d and 8e against the elastic force thereof in a direction away from the engaged portions 6d and, thereby, releasing the convex portions 8f of the elastic pieces 8d and 8e from the concave portions 6e of the engaged portions 6d.

Also according to the cell module in accordance with the present embodiment, each battery cell 1 includes external terminals 1a, the CMU 10 includes an input connector 8a, and the input connector 8a and the external terminals 1a are electrically connected to each other. Accordingly, the CMU 10 (input connector 8a thereof) and the external terminals 1a can be electrically connected to each other no matter what relative positional relationship the CMU 10 and the external terminals 1a are in. Thus, it is possible to provide degrees of freedom to design factors, such as the shape and location of the CMU 10 (and the case 11 for housing the CMU 10).

Note that the present invention is not limited to the above-described embodiment, but may be modified in various other ways without departing from the gist of the present invention.

For example, a plurality of battery cells 1 are housed in one enclosure 4 in the above-described embodiment. The present invention is not limited to this configuration, however. Alternatively, only one battery cell 1 may be housed in the enclosure 4.

Figure 8:
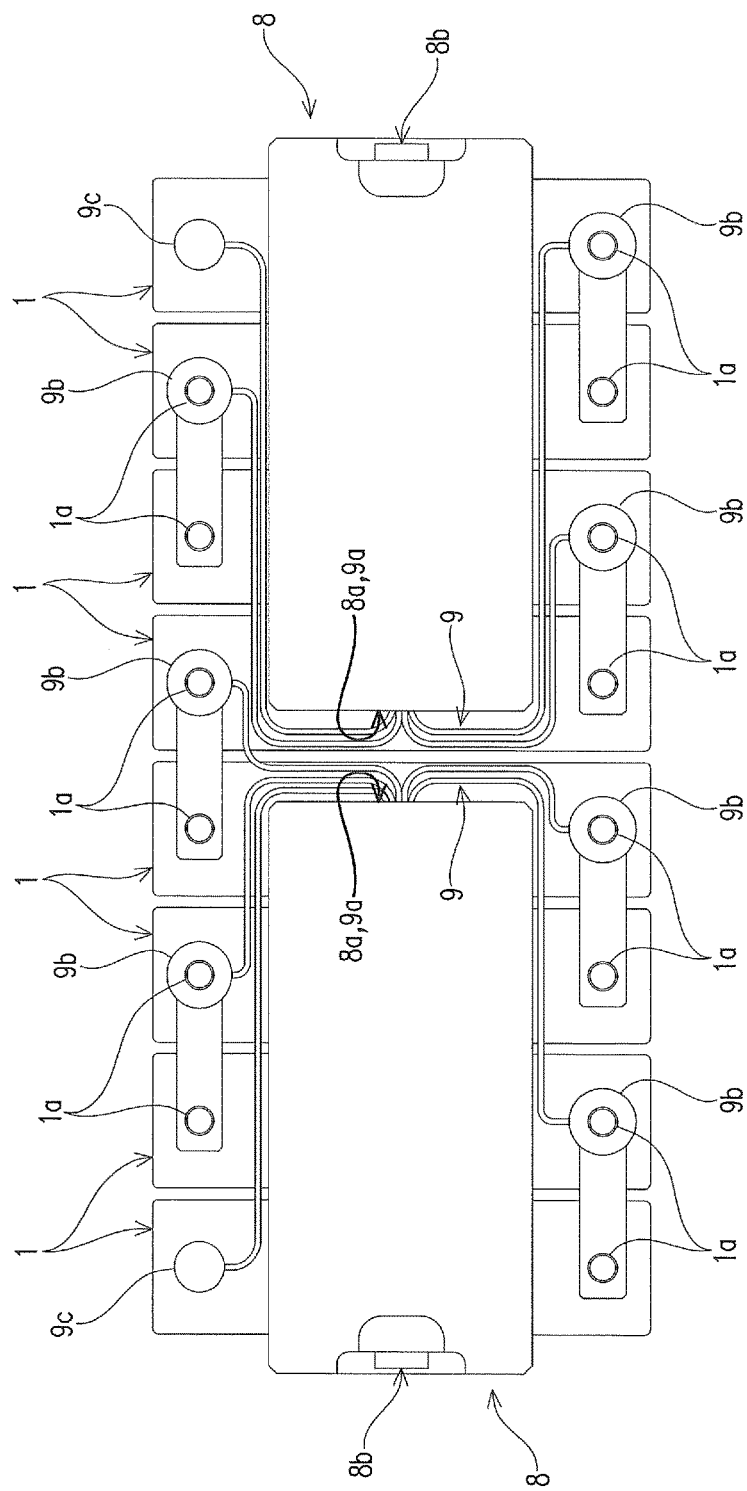
FIG. 8 is a top view illustrating a state in which two cell monitor unit modules are mounted in a cell module according to another embodiment of the present invention.

Also in the above-described embodiment, one CMU module 8 is provided in one cell module. The present invention is not limited to this configuration, however. For example, a plurality of CMU modules 8 may be provided in one cell module as in the case of two CMU modules 8 in one cell module. Alternatively, one each CMU module 8 may be provided in a group of several cell modules. In this case, there mixedly exist cell modules including a CMU module 8 and cell modules not including a CMU module 8. Note that a configuration in which a plurality of CMU modules can be mounted on a plurality of cell modules is effective in such cases as described below. For example, in a case where a plurality of cell modules mounted on an automobile have a plurality of sizes, no CMU modules may be mounted on cell modules liable to generate heat, whereas CMU modules may be mounted on cell modules unlikely to generate heat. Thus, it is possible to efficiently take measures against heat generation. In addition, no CMU modules may be mounted either on cell modules closer to a heat source of the automobile. Thus, it is possible to increase the degree of freedom to select whether or not a CMU module is mounted. If two CMU modules 8 are provided in one cell module as illustrated in FIG. 8, these CMU modules 8 are preferably disposed so that the input connectors 8a thereof are opposed to each other between the adjacent CMU modules 8. That is, connection of the output connector 9a of the harness 9 to the input connectors 8a of the CMU modules 8 is made between the CMU modules 8. In this case, the distance between the input connector 8a of each CMU module 8 and each external terminal 1a is reduced, and therefore, the harness wires of the harness 9 are shortened. Note that the enclosure body and the inner cover are not illustrated in FIG. 8. As described in the embodiment, however, the two CMU modules 8 are attached to the inner cover and the inner cover is attached to the enclosure body, thereby mounting the two CMU modules 8 on one cell module.

Also in the above-described embodiment, the CMU module 8 is attached to one or the other side of the inner cover 6 in the alignment direction. The present invention is not limited to this configuration, however. The CMU module 8 may be attached to any position of the inner cover 6 in the alignment direction. To that end, the inner cover 6 (beam portions 6b thereof) includes engaged portions 6d corresponding in number to the engaging portions 8c included in the CMU module 8 in each of positions where the CMU module 8 is to be attached to the inner cover 6. This way of configuration further increases the degree of freedom to select a position where the CMU module 8 is to be mounted.

Also in the above-described embodiment, the outer cover 7 includes a concave portion 7b (inserted-through portion) adapted to the swelled shape 13b of the CMU module 8 to be attached to one or the other side of the inner cover 6 in the alignment direction. The present invention is not limited to this configuration, however. Alternatively, the outer cover 7 may include an opening portion corresponding to the portion having the swelled shape 13b formed in the CMU module 8 to be attached to a midway position of the inner cover 6 in the alignment direction.

Also in the above-described embodiment, the CMU module 8 includes a portion having the swelled shape 13b greater in height than the beam portions 6b. The present invention is not limited to this configuration, however. The CMU module 8 (portion thereof having the swelled shape 13b) may not be greater in height than the external terminals 1a or the beam portions 6b, whichever is higher. In this case, the CMU module 8 fits in a space 6c (dead space) between the external terminals 1a or between the beam portions 6b without protruding heightwise. Thus, a space occupied by the CMU module 8 falls within the height of the external terminals 1a or the beam portions 6b and is, therefore, kept to a minimum.

Also in the above-described embodiment, the CMU module 8 is attachably and detachably mounted on the inner cover 6. The present invention is not limited to this configuration, however. Alternatively, the CMU module 8 may be attachably and detachably mounted on the outer cover 7.

Also in the above-described embodiment, the CMU module 8 is attachably and detachably mounted on the inner cover 6, i.e., inside the enclosure 4. The present invention is not limited to this configuration, however. The CMU module 8 may be attachably and detachably attached to the outside of the outer cover 7, i.e., outside the enclosure 4. In this case, the CMU module 8 is placed in a state of being exposed on the outside of the enclosure 4.

Also in the above-described embodiment, the CMU module 8 includes the engaging portions 8c and the inner cover 6 includes the engaged portions 6d. The present invention is not limited to this configuration, however. Alternatively, the cell module may include a battery cell 1, a CMU 10, and a case 11 for housing the CMU 10, one of the battery cell 1 and the case 11 may include engaging portions, the other one of the battery cell 1 and the case 11 may include engaged portions, and the engaging portions and the engaged portions may be engageable with and disengageable from each other. Accordingly, the case 11 housing the CMU 10 can be detached from the battery cell 1 by disengaging the engaging portions from the engaged portions. In addition, the case 11 housing the CMU 10 can be attached to the battery cell 1 by engaging the engaging portions with the engaged portions.

Yet alternatively, the cell module may include a battery cell 1 and a CMU 10, one of the battery cell 1 and the CMU 10 may include engaging portions, the other one of the battery cell 1 and the CMU 10 may include engaged portions, and the engaging portions and the engaged portions may be engageable with and disengageable from each other. Accordingly, the CMU 10 can be detached from the battery cell 1 by disengaging the engaging portions from the engaged portions. In addition, the CMU 10 can be attached to the battery cell 1 by engaging the engaging portions with the engaged portions.

Also in the above-described embodiment, the engaging portions 8c are provided on the long sides of the CMU module 8 (cover 13 thereof). The present invention is not limited to this configuration, however. Alternatively, the engaging portions 8c may be provided on the short sides of the CMU module 8 (cover 13 thereof). Yet alternatively, the engaging portions 8c may be provided on both long and short sides of the CMU module 8 (cover 13 thereof).

Also in the above-described embodiment, the engaging portions 8c and the engaged portions 6d are disengaged from each other by handling the second elastic pieces 8e of the engaging portions 8c so as to elastically deform the second elastic pieces 8e toward the first elastic piece 8d side. The present invention is not limited to this configuration, however. Alternatively, such a configuration may be adopted in which the engaging portions 8c and the engaged portions 6d are disengaged from each other simply by pulling up the CMU module 8. This configuration can be realized by, for example, reducing the size of the convex portions 8f of the engaging portions 8c to some degree.

Also in the above-described embodiment, the engaging portions 8c are elastic pieces having flexibility. The present invention is not limited to this configuration, however. The engaging portions may be such means in the form of locking levers.

Also in the above-described embodiment, the engaging portions 8c are formed in the CMU module 8, and the engaged portions 6d are formed in the enclosure 4. The present invention is not limited to this configuration, however. Alternatively, the engaging portions may be formed in the enclosure 4, and the engaged portions may be formed in the CMU module 8. Accordingly, the CMU module can be detached from the battery cell by disengaging the engaging portions from the engaged portions. In addition, the CMU module can be attached to the battery cell by engaging the engaging portions with the engaged portions.

Also in the above-described embodiment, the engaging portions 8c are formed in the CMU module 8, and the engaged portions 6d are formed in the enclosure 4. The present invention is not limited to this configuration, however. Alternatively, engaging portions may be formed in some places of the CMU module 8 and engaged portions may be formed in other places thereof. That is, engaging portions and engaged portions may be mixedly provided in the CMU module 8 and the enclosure 4, respectively.

Also in the above-described embodiment, the engaging portions 8c of the CMU module 8 are provided in correspondence with a plurality of engaged portions 6d of the inner cover 6. The present invention is not limited to this configuration, however. Alternatively, the engaged portions 6d of the inner cover 6 may be provided so that one engaged portion 6d corresponds to and is engageable with each of the plurality of engaging portions 8c of the CMU module 8. Accordingly, an engaging portion 8c located in a position where the CMU module 8 is to be attached to the inner cover 6 is selected from among the plurality of engaging portions 8c to engage the engaged portion 6d with the selected engaging portion 8c. This method increases the degree of freedom to select a position where the CMU module 8 is attached to the inner cover 6.

Also in the above-described embodiment, the CMU module 8 is formed to be rectangular in plan view. The present invention is not limited to this configuration, however. Alternatively, the CMU module may be formed to be square in plan view. Yet alternatively, the CMU module may be circular, elliptical or polygonal, rather than rectangular.

Also in the above-described embodiments, the case 11 is separable. The present invention is not limited to this configuration, however. The case 11 may be formed by in-molding the CMU 10, rather than formed into a separable case. The case 11 is preferably separable from the viewpoint of enabling the replacement of the CMU 10 alone, as described above.

Also in the above-described embodiment, the CMU 10 is housed in the case 11 and is protected thereby. The present invention is not limited to this configuration, however. That is, the CMU 10 may be directly mounted as a CMU module on the enclosure 4 in an attachable and detachable manner. In this case, the structure of the engaging portions 8c of the CMU module 8, for example, can be applied to the CMU 10.

Also in the above-described embodiment, the harness 9 is directly connected to the external terminals 1a of each battery cell 1. The present invention is not limited to this configuration, however. The harness 9 may be connected to the external terminals 1a by way of a location in electrical conduction with the external terminals 1a (location conductive to the external terminals 1a but distant therefrom).

Also in the above-described embodiment, the cover is composed of the inner cover 6 and the outer cover 7. The present invention is not limited to this configuration, however. The cover may not include the inner cover 6. Alternatively, the outer cover 7 may be excluded and the inner cover 6 may be used as the cover.

Also in the above-described embodiment, a description has been made for the CMU module 8. Circuit modules intended by the present invention are not limited to the CMU module, however, but include those other than the CMU module.

Also in the above-described embodiment, a description has been made for a lithium-ion secondary battery. The type and size (capacity) of batteries are optional, however.

In addition, the present invention is not limited to a lithium-ion secondary battery. The present invention is also applicable to primary batteries and capacitors, such as electric double layer capacitors, in addition to various types of secondary batteries.

What is claimed is:

1. An electric storage apparatus, comprising:
an electric storage device;
a circuit module that, in a plan view, includes a side; and
an enclosure that includes an enclosure body for housing the electric storage device and an inner cover attached to an open surface of the enclosure body,
wherein one of the inner cover and the circuit module includes an engaging portion formed thereon,
wherein another of the inner cover and the circuit module includes an engaged portion,
wherein the engaging portion is for engagement with the engaged portion,
wherein a number of the engaging portion is different from a number of the engaged portion, and
wherein, in a stacking direction of the circuit module and the inner cover over the electric storage device, the inner cover is located between the electric storage device and the circuit module such that the electric storage device and the circuit module contact opposing surfaces of the inner cover.

2. The electric storage apparatus according to claim 1, wherein the circuit module includes a circuit and a case for housing the circuit,
   wherein the enclosure further includes an outer cover for covering the inner cover,
   wherein one of the inner cover and the case includes the engaging portion, and
   wherein another of the inner cover and the case includes the engaged portion.

3. The electric storage apparatus according to claim 1, wherein the circuit module includes a circuit,
   wherein the enclosure further includes an outer cover for covering the inner cover,
   wherein one of the inner cover and the circuit includes the engaging portion, and
   wherein another one of the inner cover and the circuit includes the engaged portion.

4. The electric storage apparatus according to claim 1, wherein the inner cover includes a beam portion,
   wherein the circuit module includes the engaging portion, and
   wherein the beam portion includes the engaged portion.

5. The electric storage apparatus according to claim 1, wherein the electric storage device includes an external terminal,
   wherein the inner cover includes a beam portion, and
   wherein, with respect to an upper surface of the inner cover, a height of the circuit module is no greater than a height of the external terminal or a height of the beam portion, whichever is higher.

6. The electric storage apparatus according to claim 1, wherein the electric storage device includes an external terminal,
   wherein the inner cover includes a beam portion, and
   wherein an outer cover includes an inserted-through portion through which, with respect to an upper surface of the inner cover, one portion of the circuit module greater in height than the external terminal or the beam portion, whichever is higher, is inserted.

7. The electric storage apparatus according to claim 1, wherein the inner cover includes the engaging portion,
   wherein the circuit module includes the engaged portion, and
   wherein the inner cover comprises a plurality of engaging portions so as to enable the mounting position of the circuit module to be changed with respect to the inner cover.

8. The electric storage apparatus according to claim 1, wherein the inner cover includes the engaged portion,
   wherein the circuit module includes the engaging portion, and
   wherein the inner cover comprises a plurality of engaged portions so as to enable the mounting position of the circuit module to be changed with respect to the inner cover.

9. The electric storage apparatus according to claim 1, wherein the circuit module includes a circuit and a case for housing the circuit, and
   wherein the case is separable.

10. The electric storage apparatus according to claim 1, wherein the engaging portion comprises an elastic piece having flexibility.

11. The electric storage apparatus according to claim 10, wherein the engaged portion includes a concave portion, and
   wherein the elastic piece includes a convex portion to be engaged into the concave portion.

12. The electric storage apparatus according to claim 1, wherein the electric storage device includes an external terminal,
   wherein the circuit module includes an input connector, and
   wherein the input connector and the external terminal are electrically connected to each other.

13. The electric storage apparatus according to claim 1, wherein the inner cover includes a beam portion, the beam portion being provided on a first surface of the opposing surfaces of the inner cover, the first surface being opposite to a second surface of the opposing surfaces of the inner cover, the second surface facing the electric storage device,
   wherein the circuit module includes the engaging portion, and
   wherein the beam portion includes the engaged portion.

14. The electric storage apparatus according to claim 1, wherein the engaging portion is directly snap-fitted with the engaged portion in a direction orthogonal to the side of the circuit module.

15. The electric storage apparatus according to claim 14, wherein the engaging portion is provided with a finger grip portion such that the engaging portion and the engaged portion are engageable with and disengageable from each other.

16. An electric storage apparatus, comprising:
   a plurality of electric storage devices, each of the plurality of electric storage devices including a pair of external terminals arranged in a first direction with an interval;
   a circuit module that, in a plan view, includes a side extending in a second direction that intersects with the first direction; and
   an enclosure that includes an enclosure body for housing the plurality of electric storage devices and an inner cover attached to an open surface of the enclosure body,
   wherein one of the inner cover and the circuit module includes an engaging portion formed thereon,
   wherein another of the inner cover and the circuit module includes an engaged portion,
   wherein a number of the engaging portion is different from the number of the engaged portion,
   wherein the engaging portion is directly snap-fitted with the engaged portion in a direction orthogonal to the side of the circuit module,
   wherein the plurality of electric storage devices are arranged along the second direction and the circuit module is disposed between the pair of external terminals of the plurality of electric storage devices in the first direction, and
   wherein, in a stacking direction of the circuit module and the inner cover over the electric storage device, the inner cover is located between the plurality of electric storage devices and the circuit module such that the plurality of electric storage devices and the circuit module contact opposing surfaces of the inner cover.

17. The electric storage apparatus according to claim 16, wherein the engaging portion comprises an elastic piece having flexibility.

18. The electric storage apparatus according to claim 16, wherein the inner cover includes a beam portion, the beam portion being provided on a first surface of the opposing surfaces of the inner cover, the first surface being opposite to a second surface of the opposing surfaces of the inner cover, the second surface facing the electric storage device,
  wherein the circuit module includes the engaging portion, and
  wherein the beam portion includes the engaged portion.

19. The electric storage apparatus according to claim 16, wherein the engaging portion is provided with a finger grip portion such that the engaging portion and the engaged portion are engageable with and disengageable from each other.

* * * * *